United States Patent
Ruch et al.

(10) Patent No.: US 12,144,343 B2
(45) Date of Patent: Nov. 19, 2024

(54) STABLE HIGH-LOAD HERBICIDAL COMPOSITIONS COMPRISING MIXED AMINE OXIDES

(71) Applicant: SPECIALTY OPERATIONS FRANCE, Lyons (FR)

(72) Inventors: Thomas Ruch, Voorhees, NJ (US); Paul Gioia, Victoria (AU); Renato Monterosso, Victoria (AU); Krish Shanmuga, Plainsboro, NJ (US)

(73) Assignee: SPECIALTY OPERATIONS FRANCE, Lyons (FR)

( * ) Notice: Subject to any disclaimer, the term of this patent is extended or adjusted under 35 U.S.C. 154(b) by 99 days.

(21) Appl. No.: 17/511,041

(22) Filed: Oct. 26, 2021

(65) Prior Publication Data
US 2022/0046916 A1 Feb. 17, 2022

Related U.S. Application Data

(63) Continuation of application No. 15/234,208, filed on Aug. 11, 2016, now Pat. No. 11,357,228.

(60) Provisional application No. 62/203,444, filed on Aug. 11, 2015.

(51) Int. Cl.
| | |
|---|---|
| *A01N 25/30* | (2006.01) |
| *A01N 25/02* | (2006.01) |
| *A01N 57/20* | (2006.01) |

(52) U.S. Cl.
CPC ............ *A01N 25/30* (2013.01); *A01N 25/02* (2013.01); *A01N 57/20* (2013.01)

(58) Field of Classification Search
None
See application file for complete search history.

(56) References Cited

U.S. PATENT DOCUMENTS

| | | | |
|---|---|---|---|
| 5,258,358 A | 11/1993 | Kocur et al. | |
| 5,700,760 A | 12/1997 | Magin et al. | |
| 5,703,016 A | 12/1997 | Magin et al. | |
| 5,858,921 A | 1/1999 | Magin et al. | |
| 2003/0087764 A1 | 5/2003 | Pallas et al. | |
| 2009/0018018 A1 | 1/2009 | Gioia et al. | |
| 2009/0318294 A1* | 12/2009 | Malec | A01N 57/20 504/206 |
| 2012/0040832 A1 | 2/2012 | Chuah et al. | |
| 2015/0164083 A1 | 6/2015 | Castelani et al. | |

FOREIGN PATENT DOCUMENTS

| | | |
|---|---|---|
| WO | 2004/107862 A1 | 12/2004 |
| WO | 2013/006860 A2 | 1/2013 |

OTHER PUBLICATIONS

Maisonneuve, B., "Amine Oxides." Kirk-Othmer Encyclopedia of Chemical Technology (Ed.), John Wiley & Sons, Inc., 2003, vol. 2, pp. 463-476, retrieved from the Internet: <https://doi.org/10.1002/0471238961.0113091413010919.a01.pub2.*

Segal, B.G., Chemistry Experiment and Theory. John Wiley & Sons, NY, pp. 205-210 (1985).

Wyrill, J.B. III and Burnside, O.C., "Glyphosate Toxicity to Common Milkweed and Hemp Dogbane as Influenced by Surfactants", Weed Science, Weed Society of America, Champaign, IL, US, vol. 25, No. 3, May 1, 1977, pp. 275-287, XP002034447, ISSN: 0043-1745.

Lane, Freezing Points of Clycerol and Its Aqueous Solutions, Industrial & Engineering Chemistry, vol. 17, No. 9, p. 924. (Year: 1925).

* cited by examiner

*Primary Examiner* — John Pak

(74) *Attorney, Agent, or Firm* — Vorys, Sater, Seymour and Pease LLP; Anthony P. Venturino; Maryellen Feehery Hank

(57) ABSTRACT

Herbicidal compositions including mixed amine oxides and aminophosphate or aminophosphonate salts, in particular, to herbicidal compositions including mixed amine oxides and high-load aminophosphate or aminophosphonate potassium salts, wherein the composition has low temperature stability (i.e., no or unobservable crystal formation) among other beneficial properties.

20 Claims, No Drawings

STABLE HIGH-LOAD HERBICIDAL COMPOSITIONS COMPRISING MIXED AMINE OXIDES

CROSS-REFERENCE TO RELATED APPLICATIONS

This application is a continuation of U.S. patent application Ser. No. 15/234,208, filed on Aug. 11, 2016, which claims the benefit of U.S. Provisional Application Ser. No. 62/203,444 filed Aug. 11, 2015, all of which are herein incorporated by reference.

FIELD OF THE INVENTION

The invention relates to stable agricultural herbicide compositions, comprising mixed amine oxides.

BACKGROUND

Herbicidally active glyphosate compositions are known and are commercially available in the form of ammonium, isopropylamine and other salts. These herbicidal compositions are generally applied to weeds and unwanted vegetation in the form of an aqueous formulation containing a variety of adjuvants including for example wetting agents, surfactants, dispersants, anti-foam agents, humectants, and the like. The activity of the glyphosate composition may be improved considerably by the careful choice of additives.

Typically, there is a desire to have a higher glyphosate concentration, as the end-user (e.g., farmer) can modify the use concentration (amount of active applied to the field) by adjusting the dilution rate, and can avoid handling much product (the higher the concentration is, the lower the weight is for example).

Concentrated compositions can comprise a high amount of glyphosate, water, and at least one surfactant that can be useful as a formulation aid (dispersion, dissolution and/or stability of the glyphosate in water), and/or as a biological activator (for example increasing the efficacy the glyphosate, for example by encouraging wetting of a weed to be eliminated, or by encouraging penetration of the glyphosate into the weed). The relative amounts of glyphosate, surfactant(s) and optionally further ingredients may have also an effect onto the rheological properties of the formulation (for example viscosity, or ability to be spread). The rheological properties of the formulation as such or upon dilution are important for handling and spreading purpose.

Where the concentration of glyphosate is high, crystallization is often a significant problem. Crystallization can occur at different temperatures, at different glyphosate concentrations, or when diluting with water, but in particular is problematic at low temperatures. Crystallization is characterized by formation of small solid particles comprising glyphosate. These small particles can have the bad impact of filters clogging, nozzles clogging, creating unnecessary hazardous waste problems to dispose of the crystals, loss of activity (bioefficacy), and/or bad repartition of the active on the field.

There is a need for new compositions that address at least one of the following: low temperature stability, lower cost, by using lower cost ingredients (the aminophosphate or aminophosphonate salts and/or the surfactants), better eco-toxic profile (especially lowering amounts of fatty ethoxylates such as fatty amine ethoxylates), better viscosity profile, especially at lower temperature, and/or by avoiding crystallization, while keeping an acceptable efficacy or equivalent efficacy or even improving efficacy.

There is a continuing interest in agricultural pesticide compositions, more particularly agricultural fungicide compositions, which exhibit improved properties.

SUMMARY OF THE INVENTION

In one aspect, described herein are aqueous herbicidal composition comprising:

Equal or greater than 360 g/L (ae) of an aminophosphate or aminophosphinate potassium salt;

An alkyl dimethyl amine oxide surfactant mixture of:
(i) a first alkyl dimethyl amine oxide surfactant of the formula:

R1-N$^+$(CH$_3$)$_2$—O$^-$ wherein R1 is a linear or branched alkyl group having an average number of carbon atoms ranging from 8 to 10 carbon atoms; and (ii) a second alkyl dimethyl amine oxide surfactant of the formula:

R2-N$^+$(CH$_3$)$_2$—O$^-$ wherein R2 is a linear or branched alkyl group having an average number of carbon atoms ranging from 10 to 16 carbon atoms;

wherein R1 and R2 are different, and optionally, a solvent.

In one embodiment, the composition further comprises a third alkyl dimethyl amine oxide surfactant that is different from the first alkyl dimethyl amine oxide surfactant and/or second alkyl dimethyl amine oxide surfactant. The composition can, thus, comprise:

Equal or greater than 360 g/L (ae), typically, greater than 450 g/L (ae) or 540 g/L (ae), of an aminophosphate or aminophosphinate potassium salt;

An alkyl dimethyl amine oxide surfactant mixture of:
(i) a first alkyl dimethyl amine oxide surfactant of the formula:

R1-N$^+$(CH$_3$)$_2$—O$^-$ wherein R1 is a linear or branched alkyl group having an average number of carbon atoms ranging from 8 to 10 carbon atoms;

(ii) a second alkyl dimethyl amine oxide surfactant of the formula:

R2-N$^+$(CH$_3$)$_2$—O$^-$ wherein R2 is a linear or branched alkyl group having an average number of carbon atoms of 12 carbon atoms; and (iii) a third alkyl dimethyl amine oxide surfactant of the formula: R3-N$^+$(CH$_3$)$_2$—O$^-$ wherein R3 is a linear or branched alkyl group having an average number of carbon atoms ranging from 14 to 16 carbon atoms.

In one embodiment, the third alkyl dimethyl amine oxide surfactant is of the formula:

R3-N$^+$(CH$_3$)$_2$—O$^-$ wherein R3 is a linear or branched alkyl group having an average number of carbon atoms of 14 carbon atoms.

In one embodiment, the aminophosphate or aminophosphinate potassium salt is present at equal or greater than 450 g/L (ae), typically present at equal or greater than 540 g/L (ae).

In one embodiment, the mixture is present at equal or greater than 60 g/L, or, in another embodiment, present at equal or greater than 80 g/L, or, yet in another embodiment present at equal or greater than 90 g/L, or, in a further embodiment, present at equal or greater than 100 g/L. In one embodiment, the mixture is present at equal or greater than 120 g/L, or, in another embodiment, present at equal or greater than 140 g/L, or, yet in another embodiment present at equal or greater than 160 g/L, or, in a further embodiment, present at equal or greater than 180 g/L.

In another embodiment, the mixture is present at equal or greater than 30 g/L, or, in another embodiment, present at equal or greater than 40 g/L.

In some embodiments, the solvent is present and comprises at least one of propylene glycol, glycerine or ethylene glycol.

In some embodiments, the composition is stable at a temperature of equal or less than 10° C., typically equal or less than 5° C., or equal or less than 2° C., even more typically equal or less than 0° C. In other embodiments, the composition is stable at a temperature of equal or less than −2° C., typically equal or less than −5° C., equal or less than −10° C., even more typically equal or less than −15° C.

In another aspect, described herein are aqueous herbicidal compositions, which comprise:

Equal or greater than 540 g/L acid equivalents (ae) of an aminophosphate or aminophosphinate potassium salt, An alkyl dimethyl amine oxide surfactant mixture of:
(i) a first alkyl dimethyl amine oxide surfactant of formula:

R1-N⁺(CH₃)₂—O⁻ wherein R1 is a linear or branched alkyl group having an average number of carbon atoms ranging of 8 carbon atoms; and
(ii) a second alkyl dimethyl amine oxide surfactant of formula:

R2-N⁺(CH₃)₂—O⁻ wherein R2 is a linear or branched alkyl group having an average number of carbon atoms ranging from 10 to 16 carbon atoms; and
optionally, a solvent;
whereby the composition is stable at a temperature of equal or less than 0° C.

In one embodiment, the second alkyl dimethyl amine oxide surfactant of the formula:

R2-N⁺(CH₃)₂—O⁻ wherein R2 is a linear or branched alkyl group having an average number of 12 carbon atoms.

In another aspect, described herein are methods for regulating plant growth comprising contacting any aqueous herbicidal composition, as described herein, with a plant.

In another aspect, described is the use of any of the herbicidal compositions herein for spray applying to a plant.

DETAILED DESCRIPTION OF INVENTION AND PREFERRED EMBODIMENTS

As used herein, "liquid medium" means a medium that is in the liquid phase at a temperature of 25° C. and a pressure of one atmosphere. The liquid medium may be a non-aqueous liquid medium or an aqueous liquid medium.

As used herein the term "surfactant" means a compound that is capable of lowering the surface tension of water, more typically, a compound selected from one of five classes of compounds, that is, cationic surfactants, anionic surfactants, amphoteric surfactants, zwitterionic surfactants, and non-ionic surfactants, as well as mixtures thereof.

In one embodiment, the liquid medium is an aqueous liquid medium. As used herein, the terminology "aqueous medium" means a single phase liquid medium that contains more than a trace amount of water, typically, based on 100 pbw of the aqueous medium, more than 0.1 pbw water. Suitable aqueous media more typically comprise, based on 100 pbw of the aqueous medium, greater than about 5 pbw water, even more typically greater than 10 pbw water. In one embodiment, the aqueous emulsion comprises, based on 100 pbw of the aqueous medium, greater than 40 pbw water, more typically, greater than 50 pbw water. The aqueous medium may, optionally, further comprise water soluble or water miscible components dissolved in the aqueous medium. The terminology "water miscible" as used herein means miscible in all proportions with water. Suitable water miscible organic liquids include, for example, (C₁-C₆)alcohols, such as methanol, ethanol, propanol, and (C₁-C₆) polyols, such as glycerol, ethylene glycol, propylene glycol, and diethylene glycol. The composition of the present invention may, optionally, further comprise one or more water insoluble or water immiscible components, such as a water immiscible organic liquid, wherein the combined aqueous medium and water insoluble or water immiscible components form a micro emulsion, or a multi-phase system such as, for example, an emulsion, a suspension or a suspoemulsion, in which the aqueous medium is in the form of a discontinuous phase dispersed in a continuous phase of the water insoluble or water immiscible component, or, more typically, the water insoluble or water immiscible component is in the form of a discontinuous phase dispersed in a continuous phase of the aqueous medium.

The term "glyphosate composition" is used herein to mean a herbicidal composition comprising as active ingredient N-phosphonomethylglycine or a herbicidally acceptable salt thereof.

In one embodiment, the composition of the present invention exhibits a viscosity of less than 10 Pa·s, more typically from about 0.1 to less than 10 Pa·s, and even more typically from about 0.1 to less than 5 Pa·s, at a shear rate of greater than or equal to 10 s−1.

The amounts of aminophosphate or aminophosphonate salt, preferably potassium glyphosate or gluphosinate salts, unless otherwise provided, are expressed as acid equivalents (hereinafter otherwise referred to as "ae"). The amounts of surfactants or compositions of matter are amounts "as is", as opposed to amounts as active matter, dry amounts, or the like, unless otherwise provided. Glyphosate refers to N-(phosphonomethyl)glycine. Gluphosinate refers to 4-[hydroxy(methyl)phosphinoyl]-DL-homoalanine.

The salt, in one embodiment, is a potassium salt. Such salts are known by the skilled in the art. They can be prepared by adding potassium hydroxide to an acid form of the aminophosphate or aminophosphonate, for example to acidic glyphosate. This operation is often referred to as "neutralization". In a particular embodiment the surfactant, or a part thereof, is also added during neutralization. This is believed providing higher stability of the compositions and/or allowing higher concentrations of the aminophosphate or aminophosphonate potassium salt.

In one embodiment, the ratio between potassium and glyphosate is of about 1/1. However the ratio can of higher than 1/1. Such a ratio provides compositions having higher pH. The higher the pH, the lower the crystallization. pH can be also managed by using any other basic compounds, for example buffers.

Alkyl Dimethyl Amine Oxide Surfactant Mixture

In one embodiment, the alkyl dimethyl amine oxide surfactant mixture comprises:
(i) a first alkyl dimethyl amine oxide surfactant of the formula:

$$R1\text{-}N^+(CH_3)_2\text{—}O^-$$

wherein R1 is a linear or branched alkyl group having an average number of carbon atoms ranging from 8 to 10, which in some embodiments is 8, carbon atoms; and
(ii) a second alkyl dimethyl amine oxide surfactant of the formula:

$$R2\text{-}N^+(CH_3)_2\text{—}O^-$$

wherein R2 is a linear or branched alkyl group having an average number of carbon atoms ranging from 10 to 16, which in some embodiments is 12, carbon atoms;
wherein R1 and R2 are different.

In one embodiment, the second alkyl dimethyl amine oxide surfactant is of the formula:

$$R2\text{-}N+(CH_3)_2\text{—}O^-$$

wherein R2 is a linear or branched alkyl group having an average number of 12 carbon atoms. In other embodiments, the second alkyl dimethyl amine oxide surfactant is of the formula:

$$R2\text{-}N+(CH_3)_2\text{—}O^-$$

wherein R2 is a linear or branched alkyl group having an average number of carbon atoms ranging from 10 to 12 carbon atoms.

In another embodiment, the first alkyl dimethyl amine oxide surfactant is of the formula:

$$R1\text{-}N^+(CH_3)_2\text{—}O^-$$

wherein R1 is a linear or branched alkyl group having an average number of 8 carbon atoms.

In another embodiment, the alkyl dimethyl amine oxide surfactant is a mixture of:
(i) a first alkyl dimethyl amine oxide surfactant of formula:

$$R1\text{-}N^+(CH_3)_2\text{—}O^-$$

wherein R1 is a linear or branched alkyl group having an average number of carbon atoms ranging of 8 carbon atoms; and
(ii) a second alkyl dimethyl amine oxide surfactant of formula:

$$R2\text{-}N^+(CH_3)_2\text{—}O^-$$

wherein R2 is a linear or branched alkyl group having an average number of carbon atoms ranging from 10 to 16 carbon atoms; and In one embodiment, the second alkyl dimethyl amine oxide surfactant of the formula:

$$R2\text{-}N^+(CH_3)_2\text{—}O^-$$

wherein R2 is a linear or branched alkyl group having an average number of 12 carbon atoms.

In some embodiment, the (i) first alkyl dimethyl amine oxide surfactant is present in an amount ranging from about 10 wt % to about 45 wt %, based on the weight of the alkyl dimethyl amine oxide surfactant mixture, and wherein the (ii) second alkyl dimethyl amine oxide surfactant is present in an amount ranging from about 90 wt % to about 55 wt %, based on the weight of the alkyl dimethyl amine oxide surfactant mixture.

In some embodiments, the (i) first alkyl dimethyl amine oxide surfactant is present in an amount ranging from about 15 wt % to about 35 wt %, based on the weight of the alkyl dimethyl amine oxide surfactant mixture, and wherein the (ii) second alkyl dimethyl amine oxide surfactant is present in an amount ranging from about 85 wt % to about 65 wt %, based on the weight of the alkyl dimethyl amine oxide surfactant mixture.

In even further embodiments, the (i) first alkyl dimethyl amine oxide surfactant is present in an amount ranging from about 20 wt % to about 30 wt %, based on the weight of the alkyl dimethyl amine oxide surfactant mixture, and wherein the (ii) second alkyl dimethyl amine oxide surfactant is present in an amount ranging from about 80 wt % to about 70 wt %, based on the weight of the alkyl dimethyl amine oxide surfactant mixture.

In even further embodiments, the (i) first alkyl dimethyl amine oxide surfactant is present in an amount ranging from about 10 wt % to about 35 wt %, based on the weight of the alkyl dimethyl amine oxide surfactant mixture, wherein the (ii) second alkyl dimethyl amine oxide surfactant is present in an amount ranging from about 45 wt % to about 70 wt %, based on the weight of the alkyl dimethyl amine oxide surfactant mixture, and wherein the (iii) third alkyl dimethyl amine oxide surfactant is present in an amount ranging from about 15 wt % to about 40 wt %, based on the weight of the alkyl dimethyl amine oxide surfactant mixture.

In some additional embodiments, the (i) first alkyl dimethyl amine oxide surfactant is present in an amount ranging from about 20 wt % to about 30 wt %, based on the weight of the alkyl dimethyl amine oxide surfactant mixture, wherein the (ii) second alkyl dimethyl amine oxide surfactant is present in an amount ranging from about 40 wt % to about 60 wt %, based on the weight of the alkyl dimethyl amine oxide surfactant mixture, and wherein the (iii) third alkyl dimethyl amine oxide surfactant is present in an amount ranging from about 20 wt % to about 40 wt %, based on the weight of the alkyl dimethyl amine oxide surfactant mixture.

The herbicidal compositions as described herein are characterized by at least one of the following properties: low temperature stability, bioefficacy, and low viscosity. The alkyl dimethyl amine oxide surfactant mixtures as described herein can protect certain concentrated water soluble liquid herbicide formulations from instability at low storage temperatures when compared to the same formulations prepared using only discrete chain length alkyl dimethyl amine oxides such as those having only a C12 or greater alkyl dimethyl amine chain length. The alkyl dimethyl amine oxide surfactant mixtures as described herein can protect certain concentrated water soluble liquid herbicide formulations from instability at low storage temperatures when compared to the same formulations containing alkyl dimethyl amine oxide surfactant(s) having a C14 or greater chain length.

In one embodiment, the term Bioavailability or bioenhancing (BE) activity is defined as "an herbicide (or pesticide) or nutrient at a lower amount (dosage level) which in combination with an adjuvant provides more availability of the herbicide there by reducing the application rate of the herbicide or nutrient resulting in enhanced bioefficacy of the said herbicide. In such instance, the adjuvant, thus, enhances the bioefficacy of the herbicide when introduced into the same herbicidal composition.

In another embodiment, the herbicidal composition as described herein increases the bioefficacy of certain herbicides contained in such herbicidal composition. In other words, the adjuvant ingredients, acting synergistically, produce a low application rate formulation (versus a composition without such adjuvant ingredients). For example, in one embodiment, the adjuvant ingredients comprising the alkyl dimethyl amine oxide surfactant mixture as described herein enhance the bioefficacy of the herbicide such that lower amounts are needed (i.e., lower application rate) versus a herbicide composition without such alkyl dimethyl amine oxide surfactant mixture.

In practice, similar ingredients are added to the spray mixture separately, at much higher rates. Using the adjuvant blend components in one spray formulation, at an applicable spray rate, provides a convenient and time-saving combination for farmers. As described herein, in one embodiment, the herbicidal composition increases spray retention, and/or prevents pesticide antagonism from salts in the spray water, and/or enhances leaf penetration by providing a lipophilic and hydrophilic environment. In one embodiment, the effective amount of herbicide is about 1% of the spray mixture volume. In one embodiment, the effective amount of herbicide means about 0.5% of the spray mixture volume. In one embodiment, the effective amount of herbicide means about 2% of the spray mixture volume. In one embodiment, the effective amount of herbicide means about 1.5% of the spray mixture volume. In one embodiment, the effective amount of herbicide means about 0.9% of the spray mixture volume.

Ammonium sulfate may also be a useful adjuvant compound to achieve water conditioning effects. As a matter of fact, ammonium sulfate is known to reduce the effect of the hard water ions (especially calcium and magnesium ions) on the efficacy of some pesticides such as weak acid herbicides (like glyphosate).

The mixtures of alkyl dimethyl amine oxides used in the present invention also help to maintain low-temperature viscosity of the finished herbicide formulations at more desirable levels for handling and use, compared to formulations prepared using discrete alkyl dimethylamine oxides.

In one embodiment, the herbicide compositions as described herein maintain a viscosity of less than 200 Centipoise (cP) at a temperature at or less than 20° C., 15° C. or 10° C. In one embodiment, the herbicide compositions as described herein maintain a viscosity of less than 300 Centipoise (cP) at a temperature at or less than 20° C., 15° C. or 10° C. In one embodiment, the herbicide compositions as described herein maintain a viscosity of less than 250 Centipoise (cP) at a temperature at or less than 20° C., 15° C. or 10° C.

In one embodiment, the herbicide compositions as described herein maintain a viscosity of less than 200 Centipoise (cP) at a temperature at or less than 0° C. In one embodiment, the herbicide compositions as described herein maintain a viscosity of less than 300 Centipoise (cP) at a temperature at or less than 0° C. In one embodiment, the herbicide compositions as described herein maintain a viscosity of less than 250 Centipoise (cP) at a temperature at or less than 0° C.

In one embodiment, the herbicide compositions as described herein maintain a viscosity of less than 200 Centipoise (cP) at a temperature at or less than 5° C. In one embodiment, the herbicide compositions as described herein maintain a viscosity of less than 300 Centipoise (cP) at a temperature at or less than 5° C. In one embodiment, the herbicide compositions as described herein maintain a viscosity of less than 250 Centipoise (cP) at a temperature at or less than 5° C.

In one embodiment, the herbicide compositions as described herein maintain a viscosity of less than 200 Centipoise (cP) at a temperature at or less than −5° C. In one embodiment, the herbicide compositions as described herein maintain a viscosity of less than 300 Centipoise (cP) at a temperature at or less than −5° C. In one embodiment, the herbicide compositions as described herein maintain a viscosity of less than 250 Centipoise (cP) at a temperature at or less than −5° C.

In one embodiment, the herbicide compositions as described herein maintain a viscosity of less than 200 Centipoise (cP) at a temperature at or less than −10° C. In one embodiment, the herbicide compositions as described herein maintain a viscosity of less than 300 Centipoise (cP) at a temperature at or less than −10° C. In one embodiment, the herbicide compositions as described herein maintain a viscosity of less than 250 Centipoise (cP) at a temperature at or less than −10° C.

In one embodiment, the herbicide compositions as described herein exhibit no crystallization at a temperature at or less than 20° C. In one embodiment, the herbicide compositions as described herein exhibit no crystallization at a temperature at or less than 15° C. In one embodiment, the herbicide compositions as described herein exhibit no crystallization at a temperature at or less than 10° C. In one embodiment, the herbicide compositions as described herein exhibit no crystallization at a temperature at or less than 5° C. In one embodiment, the herbicide compositions as described herein exhibit no crystallization at a temperature at or less than 0° C. In one embodiment, the herbicide compositions as described herein exhibit no crystallization at a temperature at or less than −5° C. In one embodiment, the herbicide compositions as described herein exhibit no crystallization at a temperature at or less than −10° C.

Use of the subject surfactant combinations as in-package formulation adjuvants allows for large-scale production of highly concentrated water soluble herbicide salt formulations, such as the alkali metal salts of N-phosphonomethylglycine (commonly called glyphosate acid). Depending on the specific mixture of alkyl chain lengths employed and their relative ratios, it is possible to load the herbicide formulation with higher concentrations of the active ingredient salts than are currently commercially marketed. Higher active ingredient loadings are favored since it reduces transportation and warehousing costs and allows each package to treat more surface area.

In one embodiment, the mixture is present at equal or greater than 60 g/L, or, in another embodiment, present at equal or greater than 80 g/L, or, yet in another embodiment present at equal or greater than 90 g/L, or, in a further embodiment, present at equal or greater than 100 g/L. In one embodiment, the mixture is present at equal or greater than 120 g/L, or, in another embodiment, present at equal or greater than 140 g/L, or, yet in another embodiment present at equal or greater than 160 g/L, or, in a further embodiment, present at equal or greater than 180 g/L.

In some embodiments, the composition is stable at a temperature of equal or less than 10° C., typically equal or less than 5° C., or equal or less than 2° C., even more typically equal or less than 0° C. In other embodiments, the composition is stable at a temperature of equal or less than −2° C., typically equal or less than −5° C., equal or less than −10° C., even more typically equal or less than −15° C. In this context, stability means minimal or no crystal formation at said low temperature. In another embodiment, stability means reduced formulation viscosity at said low temperature.

In one embodiment, the herbicidal compositions as described herein, optionally, contain a solvent or blend of solvents. In one embodiment, the solvent is a polar solvent. In another embodiment, the solvent is water-miscible. The solvent includes, but is not limited to, one or a mixture of: a water-miscible glycol ether, a water-miscible polyhydric alcohol (e.g., glycerine or propylene glycol) ether, a water-miscible alcohol, a water-miscible ketone, a water-miscible aldehyde, a water-miscible acetate.

In some embodiments, the solvent is present in the herbicidal composition and comprises at least one of propylene glycol, glycerine or ethylene glycol.

Other solvents (or solvent blends include at least one of the following) include: N-methyl-pyrrolidone (NMP, can be further identified for example with CAS number 872-50-4), diester solvents, propylene carbonate, acetophenone, ethylene glycol butyl ether, diethylene glycol butyl ether, methoxy methyl butanol, propylene glycol methyl ether, dipropylene glycol methyl ether, gamma-butyrolactone, dimethyl formamide (DMF), furfuryl alcohol, tetrahydrofuryl alcohol, neopentyl glycol, hexadiols, hexylene glycol, glycol ether amines, ethylene glycol monoacetate.

Examples of diester solvents have the following formula:

R1OOC—(CH2)*n*-COOR2, wherein R1 and R2, which are identical or different, are C1-C10, typically C1-C6, linear or branched, alkyl, aryl, alkaryl or arylalkyl groups, and n is an average number of from 2 to 4.

In one embodiment, the diester solvent(s) is a blend of dibasic esters derived from by-products in the reaction, synthesis and/or production of hexamethylenediamine utilized in the production of polyamide, typically polyamide 6,6. The diester solvent(s), in one embodiment, comprises a blend of dialkyl esters of adipic diacids, methylglutaric diacids, and ethylsuccinic diacids (herein referred to sometimes as "MGA", "MGN", "MGN blend" or "MGA blend").

In certain embodiments, the dibasic ester blend comprises:

a diester of formula I:

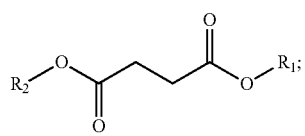

a diester of formula II:

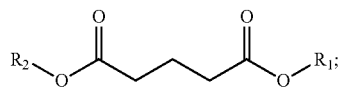

and
a diester of formula III:

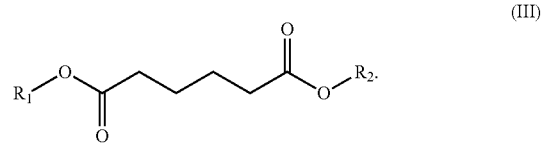

R1 and/or R2 can individually comprise a hydrocarbon having from about 1 to about 8 carbon atoms, typically, methyl, ethyl, propyl, isopropyl, butyl, isobutyl, n-butyl, isoamyl, hexyl, heptyl or octyl. In such embodiments, the blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula III. The blend is generally characterized by a flash point of 98° C., a vapor pressure at 20° C. of less than about 10 Pa, and a distillation temperature range of about 200-300° C.

In certain other embodiments, the dibasic ester blend comprises:

a diester of the formula IV:

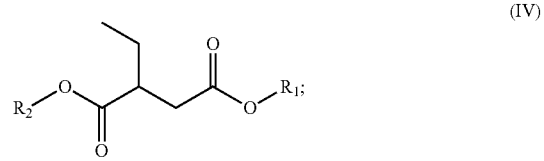

a diester of the formula V:

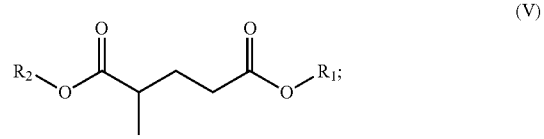

and, optionally,
a diester of the formula VI:

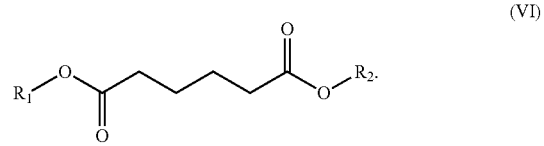

R1 and/or R2 can individually comprise a hydrocarbon having from about 1 to about 8 carbon atoms, typically, methyl, ethyl, propyl, isopropyl, butyl, isobutyl, n-butyl, isoamyl, hexyl, heptyl, or octyl. In such embodiments, the blend typically comprises (by weight of the blend) (i) from about 5% to about 30% of the diester of formula IV, (ii) from about 70% to about 95% of the diester of formula V, and (iii)

from about 0% to about 10% of the diester of formula VI. More typically, the blend typically comprises (by weight of the blend): (i) from about 6% to about 12% of the diester of formula IV, (ii) from about 86% to about 92% of the diester of formula V, and (iii) from about 0.5% to about 4% of the diester of formula VI.

Most typically, the blend comprises (by weight of the blend): (i) about 9% of the diester of formula IV, (ii) about 89% of the diester of formula V, and (iii) about 1% of the diester of formula VI. The blend is generally characterized by a flash point of 98° C., a vapor pressure at 20° C. of less than about 10 Pa, and a distillation temperature range of about 200-275° C.

In another aspect, described herein are methods for regulating plant growth comprising contacting any aqueous herbicidal composition, as described herein, with a plant.

In another aspect, described is the use of any of the herbicidal compositions herein for spray applying to a plant.

Additional Components

The herbicidal composition as described herein can, in other embodiments, comprise additional components such as: surfactants different from the alkyl dimethyl amine oxide surfactant mixture, anti-foaming agents, solvents (e.g., water miscible solvent, polar solvents, and the like), deposition control agents such as anti-rebound or anti-drift agents. In one embodiment, such additional components are optionally added after the initial formulation step.

In one particular embodiment, the herbicidal compositions described herein contain (i) an alkyl dimethyl amine oxide surfactant mixture and (ii) a surfactant which is not an alkyl dimethyl amine oxide surfactant. In one embodiment, the surfactant chosen from at least one or a mixture of: a cationic surfactant, an anionic surfactant, a nonionic surfactant, a zwitterionic surfactant and an amphoteric surfactant. This additional (ii) surfactant, in some embodiments, can provide further advantages or synergies in term of costs, and/or bioefficacy, and/or rheology management, and/or environment concerns.

Some non-limiting examples of additional surfactants include at least one of: an ethoxylated fatty amine; a fatty amine; an ether carboxylate; an acid or non-acid mono- and di-ester phosphate, optionally polyalkoxylated; an alkylmonoglycoside or alkylpolyglycoside, advantageously octylglycoside, an octylpolyglycoside, decylglycoside, a decylpolyglycoside; betaines (alkyldimethylbetaines, or alkylamidoalkyldimethylbetaines, such as alkylamidopropyldimethylbetaines).

In a particular embodiment, the composition is substantially free (less than 10% by weight of the total surfactant amount, preferably less than 1%, preferably none) of betaine.

In a particular embodiment the composition is substantially free (less than 10% by weight of the total composition, preferably less than 1%, preferably none) of a humectant selected from polyhydric alcohols, polysaccharide humectants, and mixtures thereof.

The compositions of the invention can be prepared by mixing their different constituents with moderate stirring, at a temperature in the range 15° C. to 60° C. In one embodiment, the temperature is ambient temperature (15-30° C.). The surfactant, in one embodiment, is added after the other components have been added and mixed. Alternatively the surfactant or a part thereof is added during neutralization of the aminophophate or aminophosphonate. The remaining components can be added afterwards.

In one embodiment the composition comprises the solvent. In this embodiment the composition advantageously comprises from 1 g/L to 50 g/L of the solvent, preferably from 5 g/L to 25 g/L of the solvent, preferably from 10 g/L to 20 g/L of the solvent.

In an exemplary embodiment the herbicidal composition as described herein comprises: from 450 to 540 g/L of glyphosate potassium salt, and from 150 to 170 g/L of the alkyl dimethyl amine oxide surfactant mixture.

In another exemplary embodiment the herbicidal composition as described herein comprises: from 450 to 540 g/L of glyphosate potassium salt, from 150 to 170 g/L of the alkyl dimethyl amine oxide surfactant mixture, and from 1 to 50 g/L of the solvent, preferably from 5 to 25, preferably from 10 to 20 g/L.

At high potassium glyphosate loads, (450 to 540 g/L of glyphosate potassium salt, typically greater than 540 g/L) the composition comprises the solvent, and the ratio by weight between the solvent and the alkyl dimethyl amine oxide surfactant mixture is of from 0.025 to 0.20, typically from 0.05 to 0.15, more typically from 0.08, to 0.1.

In an embodiment the composition has a viscosity of lower than 250 cP at 0° C. at 45 s−1 shear rate. In an embodiment the composition has a viscosity of lower than 250 cP at 35° C. with a Brookfield RTV viscosimeter, spindle 4 and/or 2, at 50 rpm and/or 20 rpm. In an embodiment the composition has a viscosity of lower than 250 cP at 25° C. and/or 26° C. with a Brookfield RTV viscometer, spindle 4 and/or 2, at 50 rpm and/or 20 rpm. These can be realized for compositions comprising at least 530 g/L glyphosate potassium salt.

In an embodiment the composition has a viscosity of higher than 250 cP at 0° C. at 45 s−1 shear rate, for example higher than 1000 cP. In an embodiment the composition has a viscosity of higher than 250 cP, for example higher than 1000 cP at 0° C. with a Brookfield RTV viscosimeter, spindle 4 and/or 2, at 50 rpm and/or 20 rpm. In an embodiment the composition has a viscosity of higher than 250 cP, for example higher than 1000 cP, at 25° C. and/or 26° C. with a Brookfield RTV viscosimeter, spindle 4 and/or 2, at 50 rpm and/or 20 rpm. These can be realized for compositions comprising at least 530 g/L glyphosate potassium salt.

The herbicidal composition of the invention can be thus used to treat plants, normally after diluting with water. The diluted composition can be applied onto a field by any appropriate mean. The dilution, and the application onto the field, can be for example such that the amount of aminophosphate or amoniphosphonate potassium salt, preferably glyphosate potassium salt, is of from 500 g acid equivalent/ha to 1500 g acid equivalent/ha, typically from 600 to 1200 g/ha.

Experiments

Experiments were performed to illustrate the effect of the glyphosate potassium salt formulations described herein on pH and the effect of different alkyl chain distributions in the dimethyl amine oxides on the herbicide formulation viscosity measured at 5° C.

Preparation of highly loaded glyphosate potassium salt solutions with experimental adjuvant mixtures containing alkyl dimethyl amine oxide surfactants was conducted to demonstrate the influence on the low temperature physical properties of the herbicide formulation due to changes in final system pH or changes in alkyl chain distributions used in the adjuvant mixtures.

Due to low water solubility of the active ingredient, "N-phosphonomethylglycine", commonly referred to as glyphosate acid, aqueous potassium hydroxide is used to generate the highly soluble potassium salt form. Technical grade glyphosate acid was dried in a vacuum oven to yield a white to off-white powder. Potassium hydroxide was utilized for neutralization. Resulting glyphosate potassium salt solutions were prepared having a glyphosate acid equivalent value equal to about 540 g/liter and having a pH value between about 4.5 and about 5.2 when about 7 weight % of the herbicide formulation is dissolved in deionized water and measured using a pH meter at about 22° C. In several experiments, one herbicide sample was prepared at the lower end (i.e. 4.5 to 4.8) of the pH range and a another herbicide sample was prepared at a higher pH (from about 4.8 to 5.2) to allow a comparison of the physical properties and characteristics of the samples caused by shifts in the formulation pH within the pH range commonly used in the agrochemical industry for preparing the glyphosate potassium salt.

Amine oxide surfactant preparations were obtained as aqueous solutions, containing between 30 and 40 weight % concentrations of various alkyl dimethyl amine oxides within an alkyl chain range between C8 and C16 alkyl chain length, as shown in the tables. Table 1 below illustrates the range of materials and typical alkyl chain distributions for the discrete amine oxides tested as well as for the combinations and mixtures of these discrete materials and any co-solvents or humectants.

Any mixed amine oxide adjuvant compositions which were not homogenous (not a single-phase mixture at 22° C.) were not incorporated into the glyphosate potassium salt herbicide formulations. Compositions shown in Table 1 were homogeneous when prepared and stored at about 22 deg C.

TABLE 2

Properties of herbicide formulations containing experimental adjuvants.
(All formulations contain 540 g/L ae as glyphosate potassium + 160 g/L adjuvant blends)

| Adjuvant Composition | 7% pH in H2O | Density g/ml | Viscosity cPs |
|---|---|---|---|
| 160 g/liter Adjuvant A | 5.0 | 1.36 | 73 |
| 160 g/liter Adjuvant B | 4.9 | 1.36 | 94 |
| 160 g/liter Adjuvant C | 5.1 | gel | gel |
| 160 g/liter Adjuvant E | 5.0 | gel | gel |
| 160 g/L Adjuvant K | 4.7 | 1.35 | 64 |
| 160 g/L Adjuvant K | 4.8 | 1.36 | 214 |
| 160 g/L Adjuvant K | 5.0 | 1.36 | 315 |
| 160 g/L Adjuvant L | 4.7 | 1.35 | 55 |
| 160 g/L Adjuvant M | 4.7 | 1.35 | 46 |
| 160 g/L Adjuvant M | 5.0 | 1.36 | 52 |
| 160 g/L Adjuvant F | 4.6 | 1.36 | 174 |
| 160 g/L Adjuvant F | 5.0 | 1.36 | 2500 |
| 160 g/L Adjuvant G | 5.0 | 1.36 | 755 |

Viscosity was measured at 5° C. sample temperature using a Brookfield DV-III Plus rheometer equipped with a small sample adapter and chilled water supply to maintain the desired low temperature during the measurements. Brookfield spindle SC4-18 was used at a rotational speed sufficient to result in a shear rate between 15 and 40 s$^{-1}$. Viscosity result is reported in centipoise units at a shear rate of 30 s$^{-1}$ unless otherwise stated. Some sample measurements were not obtained due to the physical state of the sample being a gel when it was produced.

TABLE 1

Alkyl chain distribution for alkyl dimethyl amine oxide mixtures

| Alkyl Chain distributions | "A" % | "B" % | "C" % | "D" % | "E" % | "F" % | "G" % | "H" % | "I" % | "J" % | "K" % | "L" % | "M" % |
|---|---|---|---|---|---|---|---|---|---|---|---|---|---|
| C8 | >97 | <2 | <1 | | | <1.3 | <0.5 | 18-24 | 18-24 | <0.5 | 1.5 | 1.7 | 1.4 |
| C10 | <2 | >96 | <2 | <1.5 | <2 | >25 | >25 | <1.5 | <2.1 | <25.5 | 49 | 67.8 | 67.8 |
| C12 | | <2 | >97 | 66.5-75 | 62-68 | >74 | 47-51.5 | 54-61 | 50-55 | 50-57 | 49.5 | 30.5 | 20-21.8 |
| C14 | | | <3 | 21-30 | 22-28 | <2.3 | 16-21 | 17-24 | 17.8-22.7 | 15.8-22.5 | 1.5 | 0.9 | 6.6-8.4 |
| C16 | | | <0.5 | <2 | 8-12 | <0.4 | 6-9 | <1.6 | 6.5-9.7 | <1.5 | 0.25 | 0.15 | 2.4-3.6 |
| C18 | | | | | <2 | | | | <1.6 | | | | 0.6 |

Adjuvant compositions were prepared independently from certain amine oxide surfactants (and mixtures) and were mixed with the appropriate concentrated glyphosate potassium salt solution (determined by choice of a product with a lower pH or higher pH target) and water and/or co-solvent in a volumetric flask to produce the finished herbicide formulations.

Table 2 shows herbicide formulations containing 540 g/L (as the glyphosate acid equivalent or "ae") of the potassium salt of glyphosate and containing 160 g/L of the experimental adjuvant compositions. The pH was measured following dilution of formulated herbicides into deionized water at 7% by weight concentration, target compositions were within the pH range between 4.5 and 5.2 at 22° C. The herbicide formulation density was measured using a Mettler Densito 30P handheld densitometer at ambient room temperature, typically about 22° C. Typical formulation densities were in the range 1.35 to 1.37 g/ml, and this is consistent with expected values for high load potassium salt of glyphosate containing ~540 g/l glyphosate ae.

As shown in Tables 1 and 2, the use of the discrete C8 or C10 alkyl dimethyl amine oxide (adjuvant A or adjuvant B) does not result in the low temperature gel formation noted with the C12 or higher alkyl chain lengths in the high load glyphosate potassium formation. Inclusion of the C8 or C10 alkyl fraction at a low level reduces the tendency to gel. It can be seen that higher pH can contribute to developing higher viscosity in some samples. Use of broader range of alkyl chain (increasing C14 and C16 content) reduces the tendency of gelling and the sensitivity of changes in pH (as in comparison of adjuvant F and adjuvant G).

Experiments done to show the effect of different alkyl chain distributions in the dimethyl amine oxides on the glyphosate potassium salt formulation viscosity measured at different temperatures and the biological efficacy of the different formulations containing the experimental adjuvants when tested on susceptible vegetation.

The compositions in Table 3, below, were prepared as follows (ae stands for acid equivalent): Samples of 50 mL each were prepared in volume flasks, individually neutralized. Tap water is used. Viscosity at different temperatures was measured (Brookfield RVT, spindle 2, 20 rpm):

TABLE 3

| Formulation ID | Adjuvant used | Active |
|---|---|---|
| AP8-14-144A | 160 g/l Adjuvant J + 50 g/l MPG | Gly K 540 ae |
| AP8-14-146A | 160 g/l Adjuvant G + 50 g/l MPG | Gly K 540 ae |
| AP10-319C | 160 g/l Adjuvant I | Gly K 540 ae |
| AP8-14-321A | 160 g/l Adjuvant H | Gly K 540 ae |

Referring to Tables 4-8, below, viscosity profiles were tested for stability, including low temperature stability. The viscosity of the composition is measured at the stated temperatures, with a RVT Brookfield Viscosimeter, Spindle No. 2, at 20 rpm. Stability (e.g., Crystallization) is evaluated after 1 week at room temperature ("RT").

Key

UTC=Untreated control
AP8-14-144A=contains 160 g/L Adujvant "J"+50 g/L monopropylene glycol
AP8-14-146A=contains 160 g/L Adjuvant "G"+50 g/L monopropylene glycol
AP10-14-319C=contains 160 g/L Adjuvant "I"
AP10-14-321A=contains 160 g/L Adjuvant "H"
RT=Room Temperature (approx. 21° C.)
N/A=Not Applicable
SG=Specific Gravity
TBC=To be confirmed

TABLE 4

Viscosity Temperature Profile

| | Viscosity (Centipoise) RVT Spindle 2, Speed 20 | | | |
|---|---|---|---|---|
| Temp | AP8-14-144A | AP8-14-146A | AP10-14-319C | AP10-14-321A |
| 20° C. | 89 | 72 | 84 | 109 |
| 15° C. | 113 | 91 | 100 | 118 |
| 10° C. | 134 | 112 | 109 | 128 |
| 5° C. | 159 | 127 | 125 | 164 |

The viscosity of the composition is measured at the stated temperatures, with a RVT Brookfield Viscometer, Spindle No. 2, at 20 rpm. Stability (e.g., Crystallization, or stable/liquid) is evaluated after 1 week at room temperature ("RT").

TABLE 5

Physical Stability after Accelerated Storage and room temperature storage.

| | Physical Observation | | | | |
|---|---|---|---|---|---|
| Formulation # | Fresh | 2 weeks/54 ° C. | 2 weeks/RT | 8 weeks/RT | 12 weeks/RT |
| AP8-14-144A | Clear, Slightly viscous liquid | Stable/Liquid | Stable/Liquid | Stable/Liquid | Stable/Liquid |
| AP8-14-146A | Clear, Slightly viscous liquid | Stable/Liquid | Stable/Liquid | Stable/Liquid | Stable/Liquid |
| AP10-14-319C | Clear, Slightly viscous liquid | Stable/Liquid | Stable/Liquid | Stable/Liquid | Stable/Liquid |
| AP10-14-321A | Clear, Slightly viscous liquid | Stable/Liquid | Stable/Liquid | Stable/Liquid | Stable/Liquid |

TABLE 6

Physical Stability after Low Temperature Storage

| | Physical Observation | | | | | |
|---|---|---|---|---|---|---|
| Formulation # | 1 week/0° C. | 1 week/ 0° C. + seed | 1 week/ −5° C. | 1 week/ −5° C. + seed | 1 week/ −10° C. | 1 week/ −10° C. + seed |
| AP8-14-144A | Stable/Liquid | Stable/Liquid | Stable/Liquid | Stable/Liquid | Stable/Liquid | Stable/Liquid |
| AP8-14-146A | Stable/Liquid | Stable/Liquid | Stable/Liquid | Stable/Liquid | Stable/Liquid | Stable/Liquid |
| AP10-14-319C | Stable/Liquid | Stable/Liquid | Stable/Liquid | Stable/Liquid | Stable/Liquid | Stable/Liquid |
| AP10-14-321A | Stable/Liquid | Stable/Liquid | Stable/Liquid | Stable/Liquid | Stable/Liquid | Crystalized after 4 days |

TABLE 7 pH Analysis after Accelerated Storage of Final Product (neat)

| | AP8-14-144A | AP8-14-146A | AP10-319C | AP8-14-321A |
|---|---|---|---|---|
| Fresh | 5.06 | 5.06 | 5.00 | 5.03 |
| 2 weeks/54° C. | 5.11 | 5.13 | TBC | TBC |
| 1 week/0° C. | 5.10 | 5.07 | TBC | TBC |
| 2 weeks RT | 5.06 | 5.06 | 5.00 | 5.03 |

TABLE 8

Specific Gravity Measurements

| | AP8-14-144A | AP8-14-146A | AP10-319C | AP8-14-321A |
|---|---|---|---|---|
| SG | 1.354 | 1.352 | 1.354 | 1.354 |

TABLE 9

Evaluation of novel high load glyphosate formulations for weed control in fallow

| Pest Type | | Weed | Weed | Weed |
|---|---|---|---|---|
| Pest Scientific Name | | Echinochloa crus-ga. Oryzicola | Echinochloa crus-ga. Oryzicola | Echinochloa crus-ga. Oryzicola |
| Part Rated | | plagr p | plagr p | plagr p |
| Rating Unit | | % (weed control) | % (weed control) | % (weed control) |
| Number of Subsamples | | 1 | 1 | 1 |
| Days After First/Last Application | | 7   7 | 14   14 | 24   24 |
| Trt-Eval Interval | | 7 DA-A | 14 DA-A | 24 DA-A |

| Trt No. | Treatment Name | Rate | Rate Unit | | | |
|---|---|---|---|---|---|---|
| 1 | Untreated Check | | | 0.0 | 0.0 | |
| 2 | Gladiator Optimax | 500 | ml/ha | 60.0 | 67.5 | 65.0 |
| 3 | Gladiator Optimax | 1000 | ml/ha | 81.7 | 83.3 | 81.7 |
| 4 | AP8-13-129B | 500 | ml/ha | 33.3 | 25.0 | 23.3 |
| 5 | AP8-13-129B | 1000 | ml/ha | 46.7 | 58.3 | 51.7 |
| 6 | AP8-13-129C | 500 | ml/ha | 36.7 | 35.0 | 43.3 |
| 7 | AP8-13-129C | 1000 | ml/ha | 40.0 | 56.7 | 53.3 |
| 8 | AP8-13-129D | 500 | ml/ha | 33.3 | 40.0 | 45.0 |
| 9 | AP8-13-129D | 1000 | ml/ha | 65.0 | 72.5 | 70.0 |
| 10 | AP8-13-130B | 500 | ml/ha | 36.7 | 43.3 | 30.0 |
| 11 | AP8-13-130B | 1000 | ml/ha | 68.3 | 68.3 | 71.7 |
| 12 | AP8-13-130C | 500 | ml/ha | 36.7 | 48.3 | 45.0 |
| 13 | AP8-13-130C | 1000 | ml/ha | 66.7 | 65.0 | 71.7 |
| 14 | AP8-13-130E | 500 | ml/ha | 30.0 | 26.7 | 25.0 |
| 15 | AP8-13-130E | 1000 | ml/ha | 56.7 | 56.7 | 56.7 |

The codes from Table 9 are as follows:
AP8-13-129B: C8 Amine oxide
(Contains adjuvant composition A from table 1)
AP8-13-129C: C10 Amine oxide
(Contains adjuvant composition A from table 1)
AP8-13-129D: C10 Amine oxide+C12, C14 Amine oxides+Glycerine (40/55/5%, respectively)
(Contains 40% of adjuvant composition B from table 1;
Contains 55% of adjuvant composition D from table 1;
And 5% glycerine)
AP8-13-130B: C10 Amine oxide+C12, C14, C16 Amine oxides+Glycerine (40/55/5%, respectively)
(Contains 40% of adjuvant composition B from table 1;
Contains 55% of adjuvant composition E from table 1;
And 5% glycerine)
AP8-13-130C: C10 Amine oxide+C12 Amine oxide (40/60%, respectively)
(Contains 40% of adjuvant composition B from table 1; and
Contains 60% of adjuvant composition C from table 1)
AP8-13-130E: C8 Amine oxide+C10 Amine oxide 30/70%, respectively)
(Contains 30% of adjuvant composition A from table 1; and
Contains 70% of adjuvant composition B from table 1)

As can be seen in Table 9, the high load glyphosate formulations containing the alkyl dimethyl amine oxide surfactant mixture mixed amine oxide as descried herein (namely, AP8-13-129D, AP8-13-130B, AP8-13-130C) performed significantly better than having a C8, C10 dimethyl amine oxide surfactants along or in combination (namely, -AP8-13-129B, -AP8-13-129C, AP8-13-130E). AP8-13-129D, AP8-13-130B or AP8-13-130C showed a % weed control up to 70% greater than -AP8-13-129B, -AP8-13-129C or AP8-13-130E.

What is claimed is:

1. An aqueous herbicidal composition comprising:
equal or greater than 450 g/L acid equivalent (ae) of an aminophosphate or aminophosphinate potassium salt;
equal or greater than 100 g/L of an alkyl dimethyl amine oxide surfactant mixture comprising:
(i) a first alkyl dimethyl amine oxide surfactant present at 15 to 35% by weight of total alkyl dimethyl amine oxide surfactant mixture, the first alkyl dimethyl amine oxide surfactant of the formula:

$$R1-N^+(CH_3)_2-O^-$$

wherein R1 is a linear or branched alkyl group having 8 carbon atoms; and
(ii) a second alkyl dimethyl amine oxide surfactant present at 85 to 65% by weight of total alkyl dimethyl amine oxide surfactant mixture, the second alkyl dimethyl amine oxide surfactant of the formula:

$$R2-N^+(CH_3)_2-O^-$$

wherein R2 is a linear or branched alkyl group having 10 to 14 carbon atoms;
wherein the second alkyl dimethyl amine oxide surfactant comprises by weight of the total alkyl dimethyl amine oxide surfactant mixture:
50-61% $R2-N^+(CH_3)_2-O^-$, wherein R2 is linear or branched C12 alkyl,
15-24% $R2-N^+(CH_3)_2-O^-$, wherein R2 is linear or branched C14 alkyl;
and optionally, a solvent chosen from the group consisting of: propylene glycol, glycerine and ethylene glycol, and
wherein the composition is free of betaine and N-methyl pyrrolidone,
wherein the composition has a viscosity of less than 300 centipoise at a temperature at or less than 20° C., measured by a Brookfield RVT viscometer, spindle 2 at 20 rpm.

2. The composition of claim 1 further comprising
third alkyl dimethyl amine oxide surfactant of the formula:

$$R3-N^+(CH_3)_2-O^-$$

wherein R3 is a linear or branched alkyl group having 14 to 16 carbon atoms.

3. The composition of claim 1 wherein aminophosphate or aminophosphinate potassium salt is present at equal or greater than 540 g/L (ae).

4. The composition of claim 1 wherein the mixture is present at equal or greater than 120 g/L.

5. The composition of claim 1 wherein the mixture is present at equal or greater than 160 g/L.

6. The composition of claim 1 wherein the solvent is present.

7. The composition of claim 1 wherein the (i) first alkyl dimethyl amine oxide surfactant is present in an amount ranging from 20 wt % to 30 wt %, based on the weight of the alkyl dimethyl amine oxide surfactant mixture, and wherein the (ii) second alkyl dimethyl amine oxide surfactant is present in an amount ranging from 80 wt % to 70 wt %, based on the weight of the alkyl dimethyl amine oxide surfactant mixture.

8. The composition of claim 1 whereby the composition is stable at a temperature of equal or less than 0° C.

9. The composition of claim 1 whereby the composition is stable at a temperature of equal or less than −10° C.

10. The composition of claim 1 whereby the composition is stable at a temperature of equal or less than −15° C.

11. The composition of claim 1, which is free of solvent.

12. The composition of claim 1, having a viscosity of less than 300 centipoise at a temperature at or less than 15° C.

13. A method for regulating plant growth comprising contacting the aqueous herbicidal composition of claim 1 with a plant.

14. An aqueous herbicidal composition comprising:
equal or greater than 540 g/L acid equivalent (ae) of an aminophosphate or aminophosphinate potassium salt,
equal or greater than 100 g/L of an alkyl dimethyl amine oxide surfactant mixture of:
(i) a first alkyl dimethyl amine oxide surfactant present at 15 to 35% by weight of total alkyl dimethyl amine oxide surfactant mixture, the first alkyl dimethyl amine oxide surfactant of the formula:

$$R1-N^+(CH_3)_2-O^-$$

wherein R1 is a linear or branched alkyl group having 8 carbon atoms; and
(ii) a second alkyl dimethyl amine oxide surfactant present at 85 to 65% by weight of total alkyl dimethyl amine oxide surfactant mixture, the second alkyl dimethyl amine oxide surfactant of formula:

$$R2-N^+(CH_3)_2-O^-$$

wherein R2 is a linear or branched alkyl group having 10 to 14 carbon atoms;
wherein the second alkyl dimethyl amine oxide surfactant comprises by weight of the total alkyl dimethyl amine oxide surfactant mixture:
50-61% $R2-N^+(CH_3)_2-O^-$, wherein R2 is linear or branched C12 alkyl,
15-24% $R2-N^+(CH_3)_2-O^-$, wherein R2 is linear or branched C14 alkyl;
and optionally, a solvent chosen from the group consisting of: propylene glycol, glycerine and ethylene glycol; and
wherein the composition is free of betaine and N-methyl pyrrolidone,
whereby the composition is stable at a temperature of equal or less than 0° C.
wherein the composition has a viscosity of less than 300 centipoise at a temperature at or less than 20° C., measured by a Brookfield RVT viscometer, spindle 2 at 20 rpm.

15. The composition of claim 14 whereby the composition is stable at a temperature of equal or less than −10° C.

16. The composition of claim 14 whereby the composition is stable at a temperature of equal or less than −15° C.

17. The composition of claim 14 wherein the (i) first alkyl dimethyl amine oxide surfactant is present in an amount ranging from 20 wt % to 30 wt %, based on the weight of the alkyl dimethyl amine oxide surfactant mixture, and wherein the (ii) second alkyl dimethyl amine oxide surfactant is present in an amount ranging from 80 wt % to 70 wt %, based on the weight of the alkyl dimethyl amine oxide surfactant mixture.

18. The composition of claim 14, which is free of solvent.

19. The composition of claim 14, having a viscosity of less than 300 centipoise at a temperature at or less than 15° C.

20. A method for regulating plant growth comprising contacting the aqueous herbicidal composition of claim 14 with a plant.

* * * * *